UNITED STATES PATENT OFFICE.

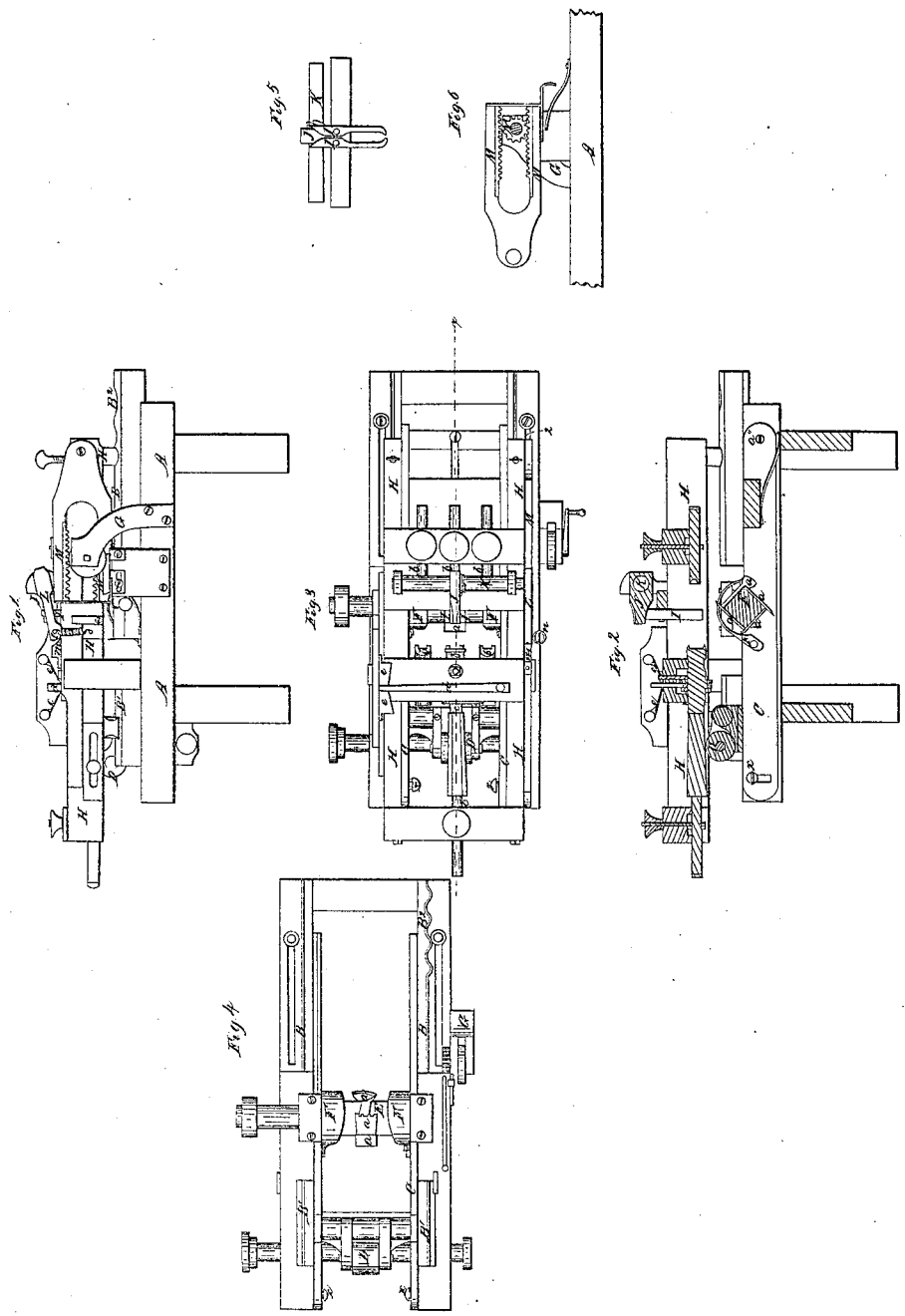
R. Powers,
Wood Molding Machine.
N°6,436.
Patented May 8, 1849.

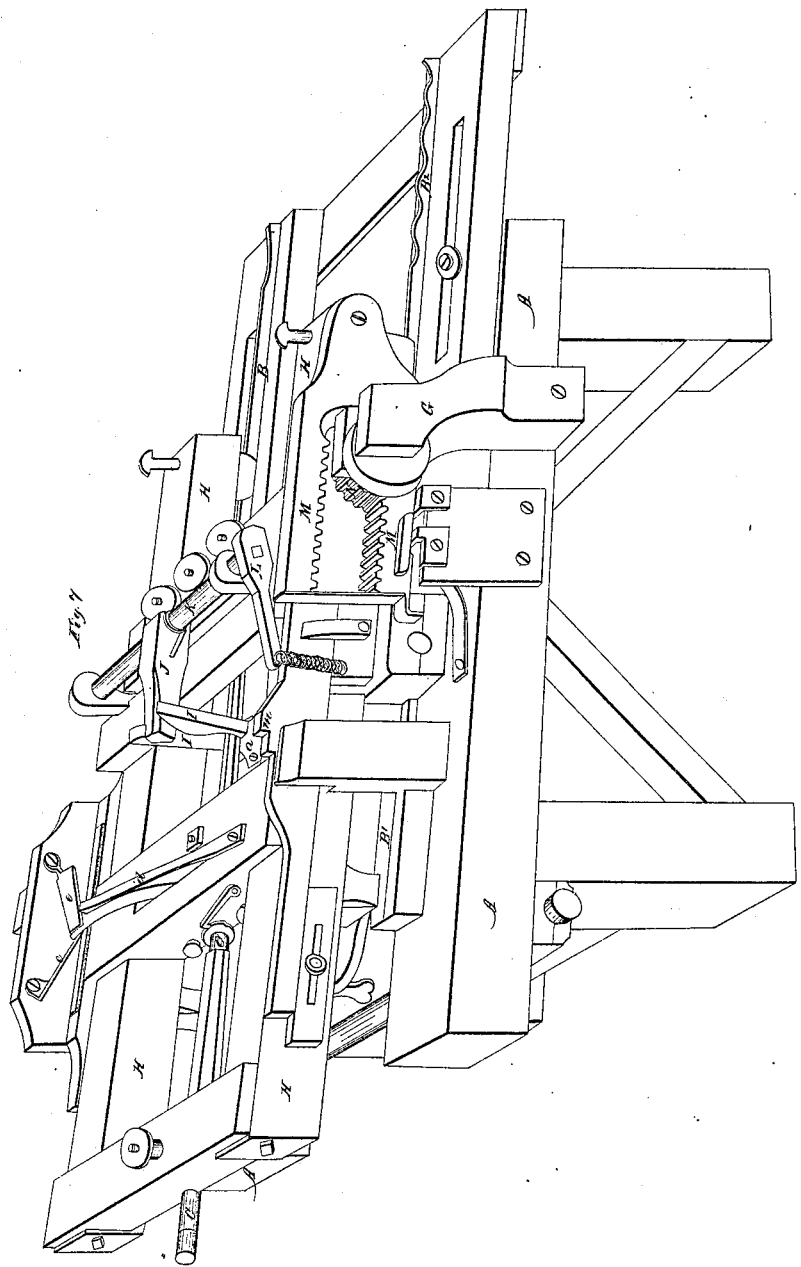

RUFUS POWERS, OF PRESCOTT, MASSACHUSETTS.

MACHINERY FOR WORKING TIMBER INTO IRREGULAR FORMS.

Specification of Letters Patent No. 6,436, dated May 8, 1849.

*To all whom it may concern:*

Be it known that I, RUFUS POWERS, of Prescott, in the county of Hampshire and State of Massachusetts, have invented certain new and useful Improvements in Machinery for Planing or Dressing Irregular Forms in Wood and Other Substances, of which the following is a full and exact description, reference being had to the annexed drawings of the same, making part of this specification, in which—

Figure 1 is a side elevation, Fig. 2 is a vertical longitudinal section, Fig. 3 is a top view with the carriage in place, Fig. 4 is a top view with the carriage removed, Fig. 5 is a front elevation of the tongs clamp or rest, Fig. 6 is a sectional view through the dotted line 2 2, Fig. 3 showing the pinion in the double rack and Fig. 7 is a perspective view of the whole machine.

The same letters indicate the same parts in all the figures.

In the accompanying drawings A is the frame on which the several parts of the machine are mounted.

B B are ways or guides upon which the carriage slides, the ways B being adjustable by set screws for the purpose of elongation when pieces of unusual length are required to be dressed.

C is a swing frame which carries the cutters, it is supported at one end on a hinge, $a'$, Fig. 2, the other resting upon a spring by which it is held against the model, and allowed to vibrate up and down to follow the longitudinal sinuosities of the surface of the same.

D is a hinged friction roller placed on the swing frame for the model to rest against.

E is the revolving cutter stock arranged to receive the four cutters $a$ whose cutting edges are alternately smooth and toothed as represented in Fig. 4 to prevent the surface of the wood from being splintered.

F F are hinged, bent adjustable gages for the model to rest upon when it is required to dress a piece to correspond exactly therewith in size and form.

G is a support for the pinion which gears into and alternates the rack M which moves the carriage back and forth.

H is the carriage which slides on the ways B and carries the mandrels $b$ which support the pieces to be dressed, and the mandrels $c$ which hold the model or pattern, the revolving mandrels are connected by a train of cog wheels, on the axis of one of which a ratchet wheel is secured to which an intermittent rotation is given by the lever $d$ which acts upon it by means of a click which it carries, this lever is held down by a spring, but at each extremity of the alternations of the carriage is lifted by ascending the inclined planes $e\ e$, which planes being adjustable by set screws may be placed so as to raise the arm of the ratchet more or less; the mandrels, with the pieces they support being of course turned around a corresponding distance.

I is a clamp, rest, or support which is opened and closed by means of the spring turning wedge J mounted on the rock shaft K, to which an oscillating motion is given by the lever L; the foot $l$ of this lever is raised by the inclined planes $m\ m$, and drawn down again by the spring $n$; the inclined planes $m\ m$ being fastened by set screws, may be adjusted at any required distance apart, so that they will release the piece being dressed, from the clamp I at the end of each vibration of the carriage, while the position of the piece is changed to present a new surface to the cutters; but seizing it again as soon as the cutters begin to act, and holding it firmly until they reach its opposite end, when the clamp is again loosened, and the piece again turned as before.

To the side of the carriage a double rack M is attached by a hinge which allows it to oscillate up and down; one arm of the rack is made, by any suitable device, to engage the teeth of the lower side of the pinion N until it has moved the carriage H the required distance in one direction; that arm is then detached, and the other engaged to the opposite side of the pinion, until the carriage is brought back again, when it is again changed to the first position and the operation repeated as often as required.

The operation of this machine is as follows: The transverse blocks of the carriage on which the mandrels are mounted being adjusted at a suitable distance apart to receive the rough blocks between the mandrels $b\ b$ and the pattern between the mandrels $c\ c$, thus arranged the pattern must be of the same length as the pieces to be dressed, but the projections or indentations on it, must be greater than those required to be produced on the piece being dressed, in the proportion of their relative distance from the axis on which the frame vibrates—if the positions of the rough blocks and the model were transposed the form of the pattern would differ in an opposite manner, the indentations and projections being smaller than those required in the piece being dressed; this preliminary adjustment of the pattern and rough blocks being properly effected the cutter is caused to revolve by suitably arranged pulleys and bands, or cog wheels, and the carriage is alternated by the action of the vibrating double rack and pinion, which causes the rough blocks to be traversed over the cutter until they are reduced to the desired form. The position of the pattern is changed each time the rough block has passed over the cutters, and may be made of such a configuration as will give to the piece to be dressed any required form, provided the curves of the indentations are of a greater radius than the circle described by the cutting edges of the knives. In dressing a sinuous surface the alternation of the toothed with the straight cutters makes a smooth and regular surface which otherwise could scarcely be dressed without being splintered to an extent that would materially detract from the beauty and perfection of the workmanship. Any number of pieces may be dressed at the same time, for which mandrels are provided. When long pieces are required to be dressed, the middle block for the support of the mandrels is removed to one extremity of the carriage, from whence the end block has been previously removed, a pattern of the precise form and size of the pieces to be dressed is then placed in the carriage, and parallel thereto as many rough blocks as there is room for, and the bent gage F placed under the pattern and adjusted so that its upper surface will be at the same distance from the center of the axis as the periphery of the circle in which the edges of the cutters revolve. A series of clamp tongs J are then arranged across the carriage one for each rough block, and one for the pattern; they seize the pieces by the middle and hold them firmly while the cutter is passing over them, but release them again at each extremity of the alternations of the carriage that they may be turned for the purpose of presenting a fresh surface to the action of the cutters—the wedge J is forced between the levers of the tongs by the spring $n$ and being much tapered presses these levers outward with considerable force, causing their lower ends to grasp and hold firmly whatever may be placed between them. The inclined planes $m$ being adjustable, may be placed so as to detach the clamp from the piece being dressed, at any required point in the motion of the carriage.

The swing frame C may be fastened to the frame A by means of the clamp screws $x$, and the carriage placed upon guides bent into a sinuous form, as represented at $B^2$ Fig. 4, or in any other irregular form, which will give to the carriage a motion that will present the rough block to the action of the cutters in such positions as will cause it to be dressed into the desired shape, in this way the guides or ways $B^2$ become, or in their action are equivalent to, a pattern.

Having thus described the construction and operation of my improved apparatus for dressing irregular forms in wood, what I claim therein as new and desire to secure by Letters Patent is—

The combination of the clamp tongs I wedge J, rock shaft K, lever L and inclined planes $m$ $m$ with the carriage substantially as herein described for the purpose of holding and firmly supporting slender pieces while being subjected to the action of the cutters, but releasing them while their position is being changed.

In testimony whereof I have hereunto set my hand and affixed my seal this twenty fifth day of September A. D. 1848.

RUFUS POWERS. [L. S.]

Witnesses:
 JOHN WARNER,
 JOHN T. WARNER.